(12) United States Patent
Sbandi

(10) Patent No.: US 11,316,891 B2
(45) Date of Patent: Apr. 26, 2022

(54) AUTOMATED REAL-TIME MULTI-DIMENSIONAL CYBERSECURITY THREAT MODELING

(71) Applicant: Bank of America Corporation, Charlotte, NC (US)

(72) Inventor: Michael J. Sbandi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 328 days.

(21) Appl. No.: 16/515,838

(22) Filed: Jul. 18, 2019

(65) Prior Publication Data

US 2021/0021636 A1    Jan. 21, 2021

(51) Int. Cl.
*G06N 20/00* (2019.01)
*G06K 9/62* (2022.01)
*H04L 29/06* (2006.01)

(52) U.S. Cl.
CPC ........ *H04L 63/1466* (2013.01); *G06K 9/6256* (2013.01); *G06N 20/00* (2019.01); *H04L 63/1416* (2013.01); *H04L 63/1425* (2013.01); *H04L 63/1433* (2013.01)

(58) Field of Classification Search
CPC ............. H04L 63/1466; H04L 63/1433; H04L 63/1425; H04L 63/1416; H04L 63/1441; G06N 20/00; G06N 3/084; G06N 3/0454; G06K 9/6256
USPC ........................................................ 726/23
See application file for complete search history.

(56) References Cited

U.S. PATENT DOCUMENTS

| | | | |
|---|---|---|---|
| 8,392,997 B2* | 3/2013 | Chen ................... | G06F 21/577 726/25 |
| 8,516,596 B2 | 8/2013 | Sandoval et al. | |
| 9,118,702 B2 | 8/2015 | MaCaulay | |
| 9,367,694 B2 | 6/2016 | Eck et al. | |
| 9,426,169 B2 | 8/2016 | Zandani | |
| 9,661,019 B2* | 5/2017 | Liu ....................... | G06N 3/084 |
| 9,699,209 B2* | 7/2017 | Ng ..................... | G06Q 10/0635 |
| 9,749,343 B2* | 8/2017 | Watters ............... | H04L 63/1433 |
| 9,749,344 B2* | 8/2017 | Watters ................. | G06Q 10/00 |

(Continued)

OTHER PUBLICATIONS

Barnum S. et al., "Attack Patterns as a Knowledge Resource for Building Secure Software", Copyright 2007 Cigital, Inc., 31 pgs.

(Continued)

*Primary Examiner* — Badri Narayanan Champakesan
(74) *Attorney, Agent, or Firm* — Banner & Witcoff, Ltd.

(57) ABSTRACT

A plurality of communicatively coupled, networked assets of an organization may be threatened or attacked by a cybersecurity attack or other form of attack. Control mechanisms may be installed and established to protect against specific cybersecurity attacks and other infiltrations. Machine learning and predictive analytics are used to more appropriately match specific attacks and threats against specific control mechanisms, accounting for dimensionality of control mechanisms. The matching of attack patterns and control mechanisms may use test scripts that operate on data pulled from the organization's systems of record. A factor analysis of information risk (FAIR) may be performed and visual threat models may be automatically generated that show the mapping between a threat actor, attack type, control environment including dimensionality, the targeted system, and the impact on the organization.

14 Claims, 8 Drawing Sheets

(56) References Cited

U.S. PATENT DOCUMENTS

| | | |
|---|---|---|
| 9,930,061 B2 | 3/2018 | Zandani |
| 10,212,184 B2 | 2/2019 | Sweeney et al. |
| 10,218,736 B2 | 2/2019 | Ng et al. |
| 10,230,764 B2* | 3/2019 | Ng ................ G06Q 40/06 |
| 10,320,813 B1* | 6/2019 | Ahmed ............ H04L 63/1441 |
| 10,911,479 B2* | 2/2021 | Kliger .............. G06F 21/552 |
| 2007/0192344 A1* | 8/2007 | Meier ................ G06F 8/10 |
| 2010/0082513 A1* | 4/2010 | Liu ................ G06N 20/00 |
| | | 706/46 |
| 2015/0295948 A1* | 10/2015 | Hassell ............ H04L 63/1433 |
| | | 726/25 |
| 2016/0205122 A1* | 7/2016 | Bassett .............. G06F 21/577 |
| | | 726/23 |
| 2017/0063917 A1* | 3/2017 | Chesla ................ H04L 63/20 |
| 2018/0124091 A1 | 5/2018 | Sweeney et al. |
| 2018/0183827 A1 | 6/2018 | Zorlular et al. |
| 2019/0075123 A1 | 3/2019 | Smith et al. |
| 2019/0141061 A1* | 5/2019 | Krishtal ............ H04L 63/1416 |
| 2019/0394225 A1* | 12/2019 | Vajipayajula ....... H04L 63/1441 |
| 2020/0320191 A1* | 10/2020 | Asai ................ G06F 21/554 |

OTHER PUBLICATIONS

CAPEC "Common Attack Pattern Enumeration and Classification—CAPEC", Mitre, 18 pgs.

The Bugs Framework Common Attack Pattern Enumeration and Classification (CAPEC), (2009), Mitre, 2 pgs.

"Introduction: Deciphering Seven Stages of Cyber Kill Chain", (2018), Hacknowledge, 8 pgs.

Barnum, S. "An Introduction to Attack Patterns as a Software Assurance Knowledge Resource", (2007), Cigital, 85 pgs.

CAPEC-CAPEC-333:WASC Threat Classification 2.0 (Version 3.1). 2 pgs.

Storm, D. "What is Mitre's ATTCK framework? What red teams need to know". (2018), CSO Online. 4 pgs.

\* cited by examiner

AUTOMATED REAL-TIME MULTI-DIMENSIONAL CYBERSECURITY THREAT MODELING

TECHNICAL FIELD OF DISCLOSURE

The present disclosure relates to methods, systems, and computing platforms for measuring and mitigating cybersecurity threats to a computer network. More generally, the present disclosure uses machine learning and predictive analytics to take a real-time, multi-dimensional approach to mitigate threats to an entity.

BACKGROUND

The National Academy of Sciences (NAS) reported in 2014: the introduction of the Internet and the World Wide Web has revolutionized the ways we work and access information, such that we are steadily more reliant on networked, digital technology. A single global digital infrastructure has been created as a platform, and as a result, cybersecurity is a growing concern for organizations. For example, an Internet of Things (IoT) environment generates an abundance of raw data that can overwhelm an enterprise organization. As a result, decision-making for a response to cyberattacks on IoT networks may be hindered, slowed, or cumbersome. Undetected cyberattacks are even more concerning. As the digital economy continues to develop, cybersecurity has become a formidable task in the IoT era. Massive pools of personal information and other data is being shared and stored online, creating a vulnerability to attack and exploitation by bad actors.

Providing cybersecurity typically means that trade-offs have to be made among the desired attributes of systems, the NAS also reported in 2014. Setting priorities can guide these trade-offs. For example, the computing world could be divided into more and less safe/accountable sectors, and centralized management and mechanisms to control inputs into those sectors may be provided for those that require more security. Another way to establish priorities could be to make it harder to target important assets; most accounts contain relatively low-value assets, and attackers cannot target everyone with the most sophisticated possible attacks. However, weakly protected accounts may become more valuable over time as people use them more and for more things. For instance, basic e-mail accounts should be viewed as extremely sensitive because they are often used to reset passwords. Yet the security on the accounts may not be upgraded in line with their increase in value over time, rendering these aspects more vulnerable.

Furthermore, a July 2018 discussion paper by The Bank of England advocated for building the UK financial sector's operational resilience. The paper promoted a paradigm shift that encouraged financial institutions to consider cyber threat as a primary risk factor and assume that operational disruptions will occur. The paper suggested that the concept of operational resilience is an evolution of current business continuity and disaster recovery response, because it emphasizes the potential impact of cyber-attacks and accounts for operational processes and services. The paper advocated a business-services approach to operational resilience, while recommending that testing/planning address the probabilistic nature of severe-but-plausible scenarios.

This disclosure addresses one or more of the shortcomings in the industry, thus improving the automated, real-time, multi-dimensional cybersecurity threat modeling in an organization.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for determining in real-time a likelihood of failure due to a multi-dimensional cybersecurity threat. The method including: automatically retrieving, by a computer processor, data from a system of record associated with a cybersecurity threat; and assessing, by the computer processor, a current control environment by applying a test script stored in a library of test scripts in compliance with industry and internal security frameworks. The method also includes identifying, by the computer processor, a control type as one of mitigated and unmitigated, in each of a plurality of dimensions; and generating, by the computer processor, in real-time a plurality of potential cybersecurity attack patterns and mitigated combinations against control mechanisms at each step of a cyber kill chain. The method further includes using machine learning (ML) from prior test scripts to determine (i) current controls, (ii) missing controls, and (iii) recommended controls for a plurality of dimensions; and automatically generating, by the computer processor, a graphical user interface including a cybersecurity attack tree showing a combination of at least a threat actor, attack pattern, and target in at least one stage of the cyber kill chain. Other embodiments of this aspect include corresponding computer systems, apparatus, and computer programs recorded on one or more computer storage devices, each configured to perform the actions of the methods.

Implementations may include one or more of the following features. For example, a method is disclosed where the using machine learning (ML) from prior test scripts includes determining a likelihood of success of the cybersecurity threat with a predictive analytics engine. The method also includes where the plurality of potential cybersecurity attack patterns are categorized by a common attack pattern enumerated classification (CAPEC). The method where the cybersecurity attack tree shows a further combination of at least an attack vector, a mitigating control by dimension, target, and effect in at last one stage of the cyber kill chain. Implementations of the described techniques may include hardware, a method or process, or computer software on a computer-accessible medium.

One general aspect includes a multi-dimensional cybersecurity threat modeling system including: a computer processor; a tangible computer memory storing computer-executable instructions that, when executed by the computer processor, cause the multi-dimensional cybersecurity threat modeling system to: automatically retrieve data from a system of record associated with a cybersecurity threat; assess a current control environment by applying a test script; identify a control type as one of mitigated and unmitigated, in each of a plurality of dimensions; generate a plurality of potential cybersecurity attack patterns and mitigated combinations against control mechanisms at each stage of a cyber kill chain; use machine learning (ML) from prior test scripts to determine at least one of: (i) current controls, (ii) missing controls, and (iii) recommended controls for a plurality of dimensions; and automatically generate a graphical user interface including a cybersecurity attack tree showing a combination of at least a threat actor, attack pattern, and target in at least one stage of the cyber kill chain. Other embodiments of this aspect include corresponding computer systems, apparatus, and computer programs recorded on one or more computer storage devices, each configured to perform the actions of the methods.

One general aspect includes a tangible, non-transitory computer-readable medium storing computer-executable instructions that, when executed by a computer processor, cause a multi-dimensional cybersecurity threat modeling system to: automatically retrieve data from a system of record associated with a cybersecurity threat of one or more networked assets; assess a current control environment by applying a test script; identify a control type as one of mitigated and unmitigated, in each of a plurality of dimensions; generate a plurality of potential cybersecurity attack patterns and mitigated combinations against control mechanisms at each stage of a cyber kill chain; use machine learning (ML) from prior test scripts to determine at least one of: (i) current controls, (ii) missing controls, and (iii) recommended controls for a plurality of dimensions; and automatically generate a graphical user interface including a cybersecurity attack tree showing a combination of at least a threat actor, attack pattern, and target in at least one stage of the cyber kill chain. Other embodiments of this aspect include corresponding computer systems, apparatus, and computer programs recorded on one or more computer storage devices, each configured to perform the actions of the methods.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of a, an, and the include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

A plurality of communicatively coupled, networked assets of an organization may be threatened or attacked by a cybersecurity attack or other form of attack. Control mechanisms may be installed and/or established to protect against specific cybersecurity attacks and other infiltrations. Machine learning and predictive analytics are used to more appropriately match specific attacks and threats against specific control mechanisms, accounting for dimensionality of control mechanisms. The matching of attack patterns and control mechanisms may use test scripts that operate on data pulled from the organization's systems of record. A factor analysis of information risk (FAIR) may be performed and visual threat models may be automatically generated that show the mapping between a threat actor, attack type, control environment including dimensionality, the targeted system, and the impact on the organization.

Figure 1:
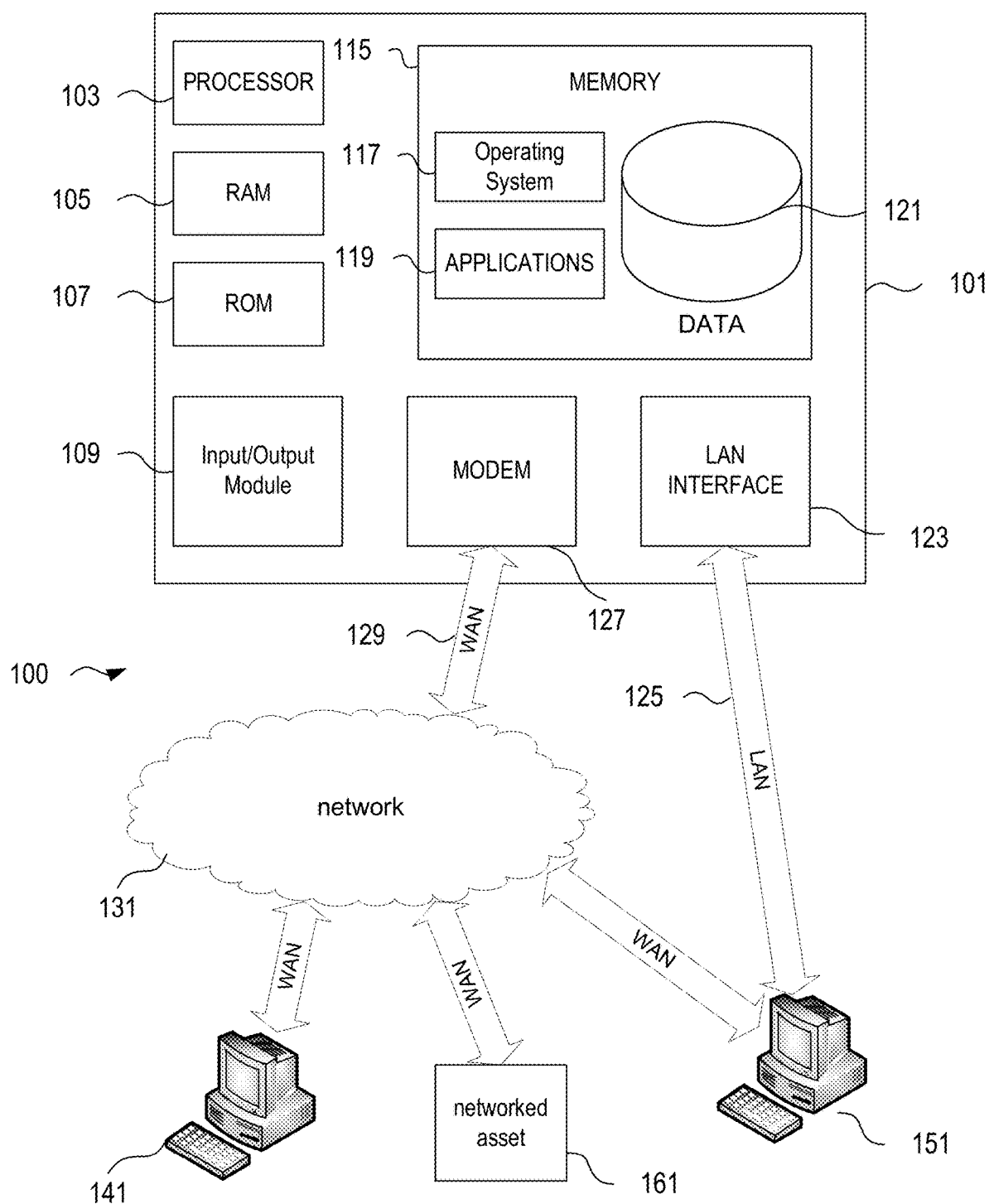
FIG. 1 illustrates a schematic diagram of a digital computing environment in which certain aspects of the present disclosure may be implemented.

FIG. 1 illustrates a system 100 block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151 and networked asset 161. The terminals 141 and 151 may be personal computers or servers that include many or all of the elements described above relative to the server 101. The networked asset 161 may be similar to terminals 141 and 151, or may be a database server device, an application server device, a web server device, a firewall device, or any other computerized asset electrically connected to the network 131. In one example, networked asset 161 may be a software application operating on a terminal device 151; the software application may be a smartphone application or may be a web browser-based application. Computing device 101, terminals 141 or 151, and/or networked asset 161 may also be mobile terminals including various other components, such as a battery, speaker, and antennas (not shown).

The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the network 131 (e.g., Internet). It will be appreciated that the network connections shown are illustrative and other means of establishing a communications link between the computers may be used. The existence of any of various protocols such as TCP/IP, Ethernet, FTP, HTTP and the like is presumed.

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
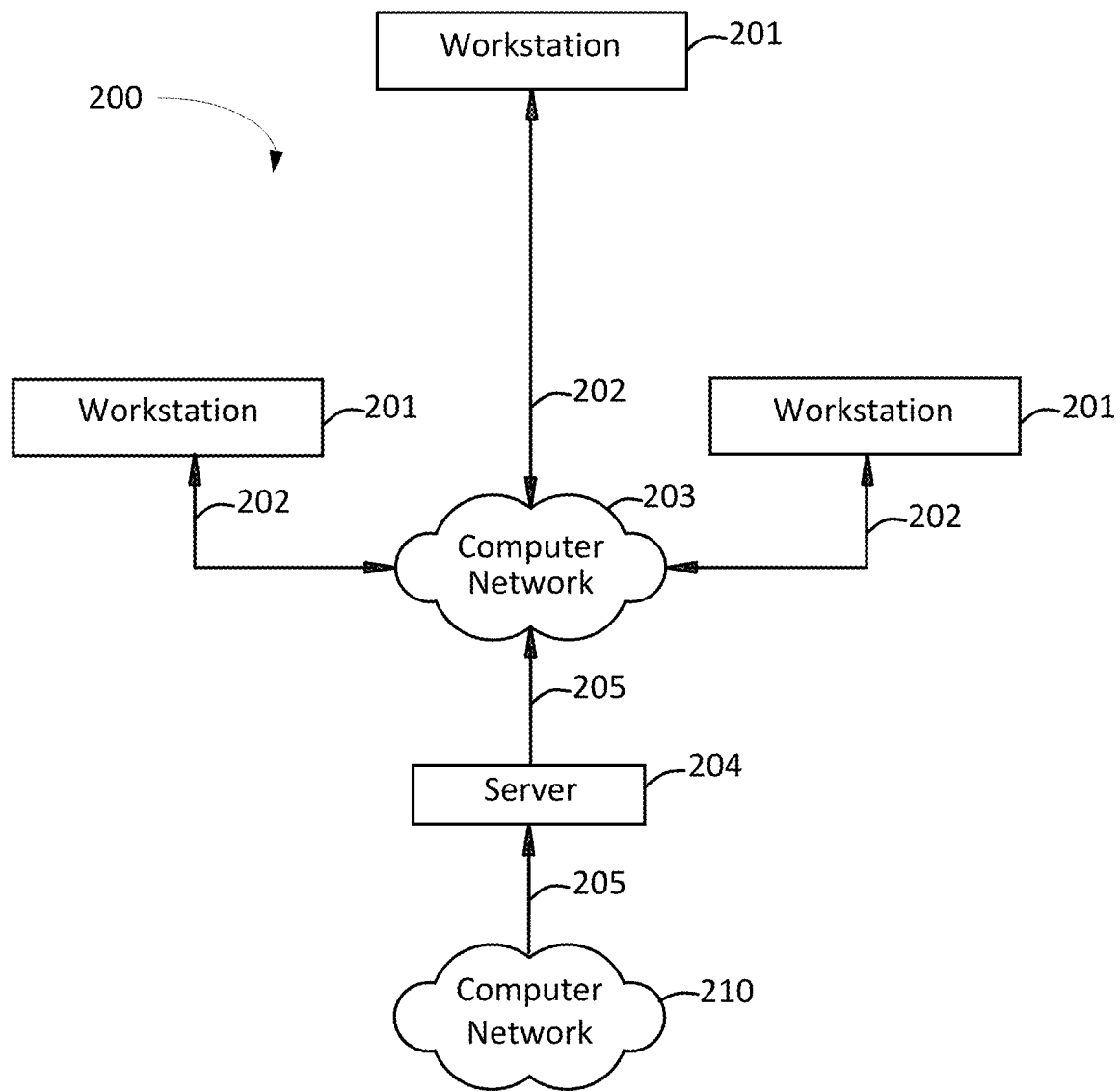
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
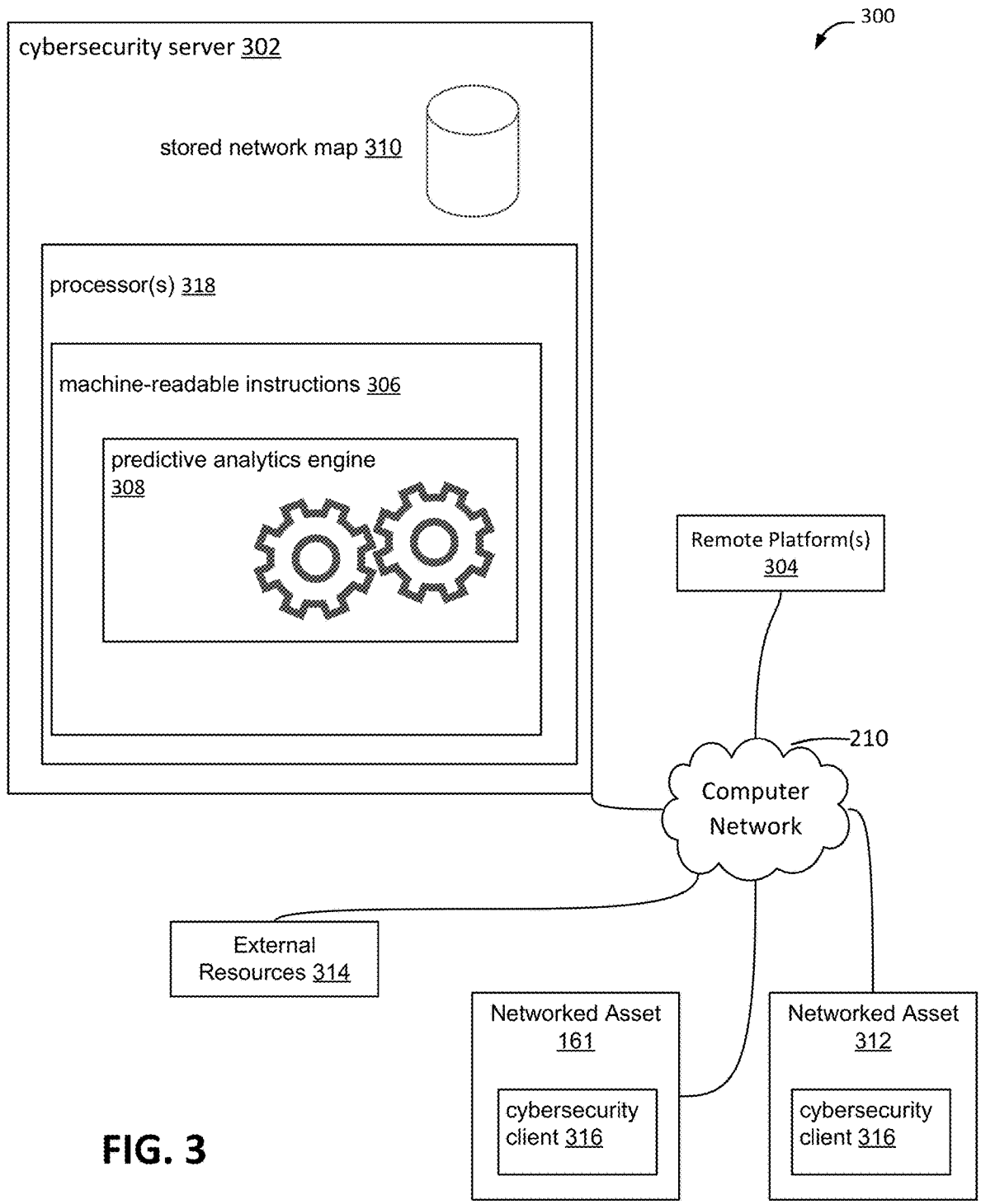
FIG. 3 illustrates a cybersecurity adaptation system configured for networked data communication, in accordance with one or more implementations.

FIG. 3 illustrates a cybersecurity adaptation system 300 configured for networked data communication, in accordance with one or more implementations. A plurality of communicatively coupled, networked assets of an organization may be threatened or attacked by a cybersecurity attack or other form of attack. Control mechanisms may be installed and/or established to protect against specific cybersecurity attacks and other infiltrations. Specifically, a visual threat model may be automatically generated that shows mappings between a threat actor, attack type, control environment including dimensionality, the targeted system, and the impact on the organization. The cybersecurity adaptation system 300 may comprise a cybersecurity server 302. In addition, the cybersecurity adaptation system 300 may comprise a stored network map 310. The stored network map 310 may be populated with data from the system of record (SOR) identifying which networked assets 161, 312 are communicatively coupled to the computer network 210 and their asset-data flow pairings, in accordance with the methods disclosed herein. In one example, the stored network map 310 may include a matrix representation of a plurality of communicatively coupled, networked assets 161, 312. When a first networked asset 161 communicates a data flow to a second networked asset 312, the asset and data flow correspond to an asset-data flow pairing stored in the matrix representation of the data store 310.

The cybersecurity server 302 may access the stored network map 310 to perform analytics on the network data and other data to calculate a magnitude of effect (e.g., values in table 614B in FIG. 6B) resulting from a cybersecurity threat/attack. For example, a predictive analytics engine 308 may be configured to calculate the magnitude of effect on a networked asset by the cybersecurity threat. The predictive analytics engine 308 may be executed by the computer processor 318 of the cybersecurity server 302.

In some examples, system 300 may include one or more cybersecurity server 302. Cybersecurity server 302 may be configured to communicate with one or more remote platforms 304 according to a client/server architecture, a peer-to-peer architecture, and/or other architectures. Remote platform(s) 304 may be configured to communicate with other connected devices to the computer network 210 via cybersecurity server 302 and/or according to a client/server architecture, a peer-to-peer architecture, and/or other architectures. Users may access system 300 via remote platform(s) 304, which may include one or more user terminals. In contrast to the network 400 in FIG. 4, which comprises a firewall device 404 that is configurable by a cybersecurity server 402 to selectively restricts data flow on the network 400, the computer network 210 in FIG. 3 is not illustrated with a physical firewall device. Instead, in some embodiments, networked assets 161, 312 may be equipped with a cybersecurity client 316 that executes on the networked asset 161, 312 to regulate the data flow to and/or from the networked asset 161, 312 over the computer network 210. The cybersecurity client 316 may be controlled by the cybersecurity server 302 through issuance of commands and/or instructions to the client 316. In other words, the cybersecurity client 316 may function as a thin-client to the fat-client embodiment in FIG. 4. In other examples, the firewall device 404 in FIG. 4 may be incorporate in a hybrid architecture with the system 300 in FIG. 3 to offer varying levels of protection.

In some implementations, system 300 may include an electronic messaging element, such as an API for an electronic mail system for sending notifications. The GPS location associated with GPS location attribute may have at least the longitude and latitude of the location to linked to a mapping application. In another example, the GPS location attribute might be based on a possible location corresponding to an IP address on the network.

The non-transitory storage media 310 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 310 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 310 may include one or more virtual storage resources (e.g., cloud storage, a virtual private network, and/or other virtual storage resources). Electronic storage 310 may store software algorithms, information determined by processor(s) 318, information received from cybersecurity server 302, and/or other information that enables cybersecurity server 302 to function as described herein. Moreover, cybersecurity server 302 may be configured by machine-readable instructions 306. Machine-readable instructions 306 may include one or more instruction modules including, but not limited to a predictive analytics engine 308. The instruction modules may include computer program modules.

For example, module 308 may include machine-readable instructions 306 for performing machine learning and neural networks computations on the data collected and/or pulled by the system 300. Some aspects of various exemplary constructions are described by referring to and/or using neural network(s). Machine learning module 308 may be configured to electronically process with a machine deep learning controller. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. System 300, including computer networks 203, 201 may incorporate various machine intelligence (MI) neutral network features of available Tensorflow software development platforms. The neural network may be generally arranged in layers of node processing units serving as simulated neutrons, such that there is an input layer, representing the input fields into the network. To provide the automated machine learning processing, one or more hidden layers with machine learning rule sets processes the input data. An output layer provides the result of the processing of the network data.

Machine learning module 308 may receives a set of network system diagrams to create a set of virtual node system data. System 300 ingests the available systems diagrams for a particular computer service. In some implementations, a node processing module electronically populates a computer readable database 310 including a plurality of network record connections based on the set of virtual node system data so as to create a database backend and a node network diagram that shows the connections and interdependencies within the network ecosystem. The node processing module may calculate the centrality of each node in the network (by using eigenvector and adjacency matrices). This measure of centrality gives an approximation of the importance of the node in the network 300. The computer readable database 310 may include the attribute data including ASCII characters in computer readable form or binary complied data. The ASCII characters or binary data can be manipulated in the software of system 300.

Machine learning module 308 may implement deep learning machine learning techniques implementing a representation of learning methods that allows a machine to be given raw data and determine the representations needed for data classification. By using deployment of deep learning software to implement processing, the computing system 300 may eliminate overhead to process the plethora of raw data that can overwhelm the enterprise and/or reduce processing overhead to improve response time and anticipate potential cyberattacks. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

One of implementations machine learning module 308 include deep learning technology that may utilize a convolutional neural network segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. These hierarchies of features can be found in many different forms of data such as speech and text, etc. In some implementations, learned observable features include objects and quantifiable regularities learned by the machine during supervised learning. A machine provided with a large set of well classified data is better equipped to distinguish and extract the features pertinent to successful classification of new data. A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given example training data set.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine learning module 308 has been trained to operate according to a specified threshold, etc.), the machine learning module 308 can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

Continuing to refer to FIG. 3, processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308 and/or other modules. Processor(s) 318 may be configured to execute modules 308; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although module 308 is illustrated in FIG. 3 as being implemented within a single processing unit, in implementations in which processor(s) 318 includes multiple processing units, one or more of module 308 may be implemented remotely from the other modules. The description of the functionality provided by the different modules 308 described herein is for illustrative purposes, and is not intended to be limiting, as any of module 308 or other modules may provide more or less functionality than is described. For example, one or more of modules may be eliminated, and some or all of its functionality may be provided by other ones of modules. As another example, processor(s) 318 may be configured to execute one or more additional modules that may perform some or all of the functionality attributed to other modules.

Figure 4:
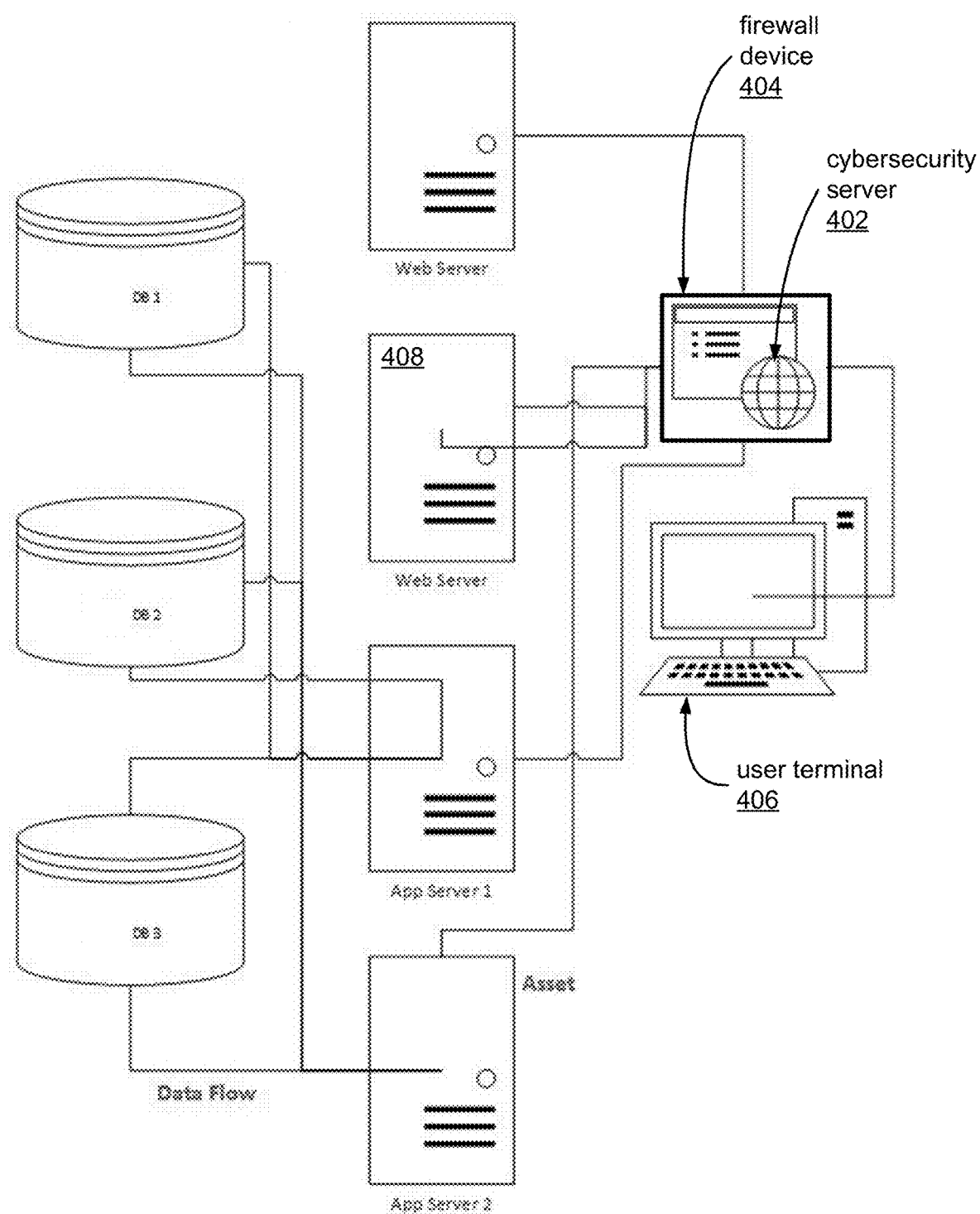
FIG. 4 illustrates a plurality of communicatively coupled, networked assets, in accordance with one or more implementations.

Like in FIG. 2, FIG. 4 is another illustrative system 400 for implementing methods according to the present disclosure. The system 400 comprises a plurality of communicatively coupled, networked assets that may be the target of a threat actor. The plurality of networked assets may include, but are not limited to, a database server device (e.g., DB1, DB2, and DB3 shown in FIG. 4); an application server device (e.g., appServer1 and appServer2 as shown in FIG. 4); a web server device (e.g., two webServers as shown in FIG. 4); a user terminal 406; a firewall device 404; and other electronic devices in network communication.

The firewall device 406 may be configured to selectively restrict the data flow over the network 400, for example, the flow of data from a first asset to a second asset. In some examples, the firewall device 404 is configurable to operate in a low cybersecurity mode, medium cybersecurity mode, or high cybersecurity mode. The different cybersecurity modes help provide the networked assets with operational resiliency in the event of a cybersecurity threat (e.g., attack or simulated attack). For example, assume the network 400 is attacked by a CAPEC 568 attack pattern that is designed to capture credentials of users via a keylogger application. The cybersecurity server 402 may determine whether a center of Internet security (CIS CSC) 8 control is implemented, to at least some extent, to protect it from the attack pattern. CIS 8 control is directed to malware defenses and includes various steps and protocols for protection against keyloggers. The cybersecurity server 402 may run one or more test scripts against the network's 400 implementation of the control mechanism (e.g., CIS 8) in each of multiple dimensions by extracting pertinent information from systems of record and determining whether or not the control mechanism is mitigated or unmitigated. Assuming the network 400 has not mitigated all dimensions of the CIS 8 control because it does not (i) promote a security focused culture to its employees, (ii) have a procedure in place to monitor and analyze audit logs, and (ii) have one or more systems to monitor firewall logs, then the cybersecurity server 402 may instruct the firewall device 404 to take remedial actions. For example, the action may be to change the firewall device 404 from operating in a low cybersecurity mode to a high cybersecurity mode. As a result, the firewall device 404 is selectively restricting or blocks more of the data flow over the network 400. In addition, depending on whether the CIS 8 control is determined to be mitigated or unmitigated, the system may generate a recommended control to protect against attacks. In this example, the recommended control may be one to automate and optimize log activity systems. Although three cybersecurity modes (low, medium, high) have been described herein for illustration purposes, any number of modes and combination of modes may be implemented in accordance with the features disclosed herein.

In one example, a user terminal 406 may be launching a cybersecurity attack on the network 400. In response, the cybersecurity server 402 may transform the firewall device from operating in a low cybersecurity mode to a high cybersecurity mode, thus increasing the selective restriction of data flow from the user terminal 406 to the web server 408 to improve the operational resiliency of the computer network. In one example, the operating state of the firewall device may be additionally controlled by software and/or firmware of the cybersecurity server 402 residing at the firewall device 404. The cybersecurity server 402 may, as explained herein, adjust the cybersecurity mode based on the criticality score, which is shown in FIG. 6B, and/or trigger one or more remedial actions to transform the network 400 in order to improve its operational resiliency. Some examples of remedial actions as part of a mitigation strategy might include, but are not limited to: applying a patch to one or more assets of the plurality of networked assets; issuing a renewed security certificate, and/or physically altering an architecture of the plurality of networked assets. The criticality score of the network may be re-calculated, as shown in FIG. 6C, after the remedial action of the mitigation strategy have been completed.

Figure 5:
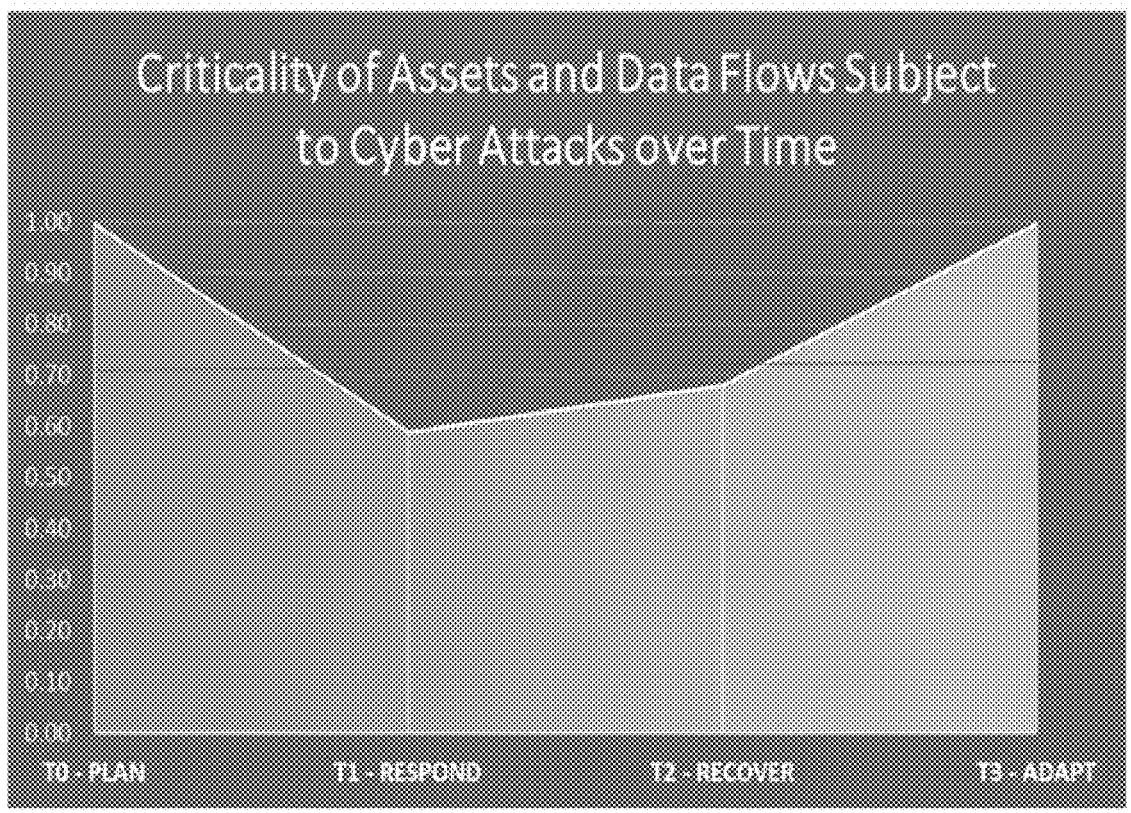
FIG. 5 is a line graph illustrating a criticality score calculated in accordance with one or more implementations.

Referring to FIG. 5, the line graph illustrates the criticality score that serves, in some examples, as a factors when the system determines whether the current controls, as defined by the CIS, are current, missing or inadequate, and if there are other recommended controls to implement in each of the multiple dimensions of the control. The criticality score in the line graph is calculated by a cybersecurity server 402 for each t time period including a plan-time-period t0, an absorb-time-period t1, a recover-time-period t2, and an adapt-time-period t3. A criticality score of "1" represents a network 400 with a high operational resiliency. Meanwhile, once an actual cybersecurity attack or a simulated cybersecurity threat is afflicted on the network 400, the criticality score decreases to 0.59 on a scale from zero to one when re-calculated at the absorb-time-period t1. Time t1 may occur at recurring intervals, random intervals, or upon trigger of an event such as a detection of symptoms of a cybersecurity attack. The graph 500 shows that at time period 0 (t0), the criticality (e.g., functioning level) score is necessarily set to 1 to indicate that the network 400 is fully functional. Meanwhile, when the cyber-attack takes place in time period 1 (t1), the criticality score is reduced to show the degraded operational resiliency of the network 400.

As the system 400 assesses and reacts to the increased cybersecurity risks, the criticality score should improve. For example, as a result of mitigating actions, the criticality score of the network 400 improves from 0.59 to 0.68 at a recover-time-period t2. While the example in the graph 500 shows only one attack/threat in time period t1, in other examples, there may be multiple attacks/threats during one or more time periods with varying impacts on the different networked assets (including data sources) in network 400. Note that if/when the operational resiliency of the network 400 is fully restored at the adapt-time-period t3, the criticality score returns to 1.0.

Of course, the amount of time and change in the criticality score will be dependent upon an ability to mitigate and respond to the cybersecurity risk. In some examples, the criticality score may continue to decline, and the cybersecurity server 402 may command the firewall device 404 to further elevate its cybersecurity mode to a high cybersecurity mode. In some instances, the firewall device 404 may temporarily shutdown all access to the network 400 to mitigate an extreme risk from a cybersecurity attack.

The criticality score may be calculated using a representation of asset-data flow pairings in the network 400. One example of a criticality function in accordance with various aspect of the disclosure, is as follows:

$$C(t, A, D, M) = \frac{\sum_{\in i\{A,D\}} w_i(t, M) \pi_i(t, M)}{\sum_{\in i\{A,D\}} w_i(t, M)}$$

where C is the critical functionality; T is the time period, for example, as shown in the graph 500 in FIG. 5; A,D is each asset-data flow pairing stored in the matrix representation stored in computer memory; M is a mitigation strategy; W is an importance value; and $\pi$ is a probability that each asset-data flow pairing is functional during the cybersecurity threat.

In one example, M, W and $\pi$ may be assigned as random probabilities between zero and one. In another example, as in real-world situations, the aforementioned values may be derived during the threat modeling phase of the assessment. The assessment may be performed, in some examples, by the cybersecurity server 402, by a subject matter expert (SME) knowledgeable about the network 400 and/or the asset (e.g., application) or data flow of concern in the threat, or by a hybrid approach involving a SME's decision being supplemented/complimented by the cybersecurity server 402. In addition to the threat model components disclosed in FIG. 6, a SME and/or cybersecurity server 402 may also consider operational characteristics such as capacity, location, and others. These values may be derived from ranges entered into a built-in Monte Carlo simulation, in one example. For example, if the capacity of the network 400 is large, it may be unaffected by a high-volume phishing attack originating from user terminal 406. In another example, the location of the origination of the cybersecurity attack and/or the location of the networked asset 161 may be a consideration in determining a value for one or more of the aforementioned variables (e.g., features) that are inputs into the criticality algorithm.

Figure 6:
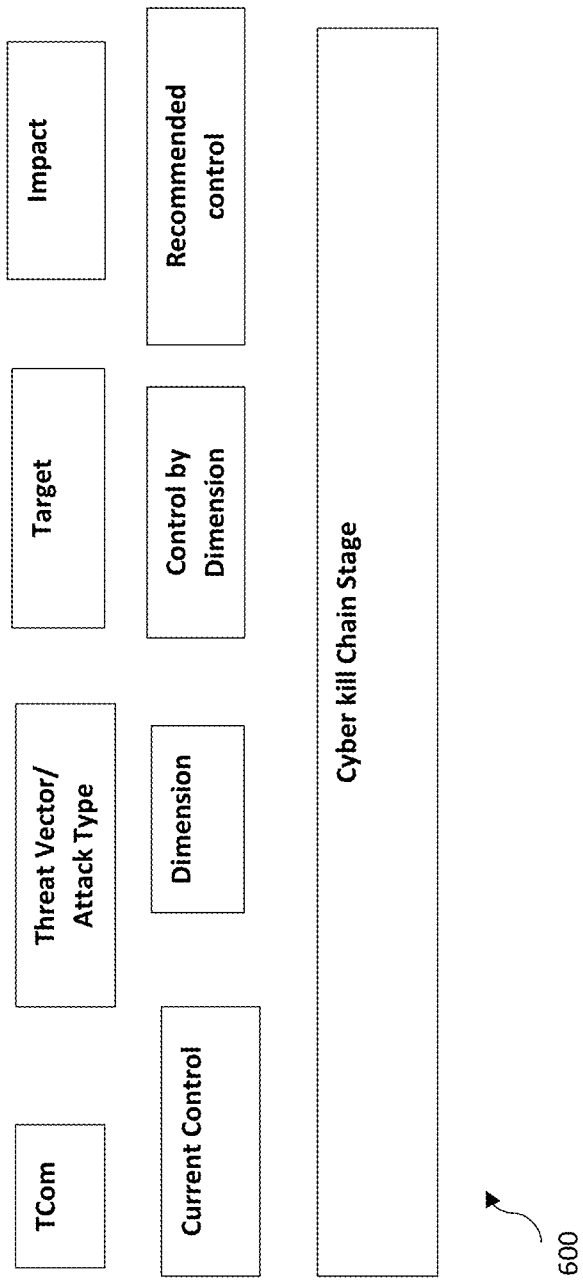
FIG. 6 is an illustrative legend of the components of a threat model depicted in FIG. 7, in accordance with one or more implementations.
Figure 7:
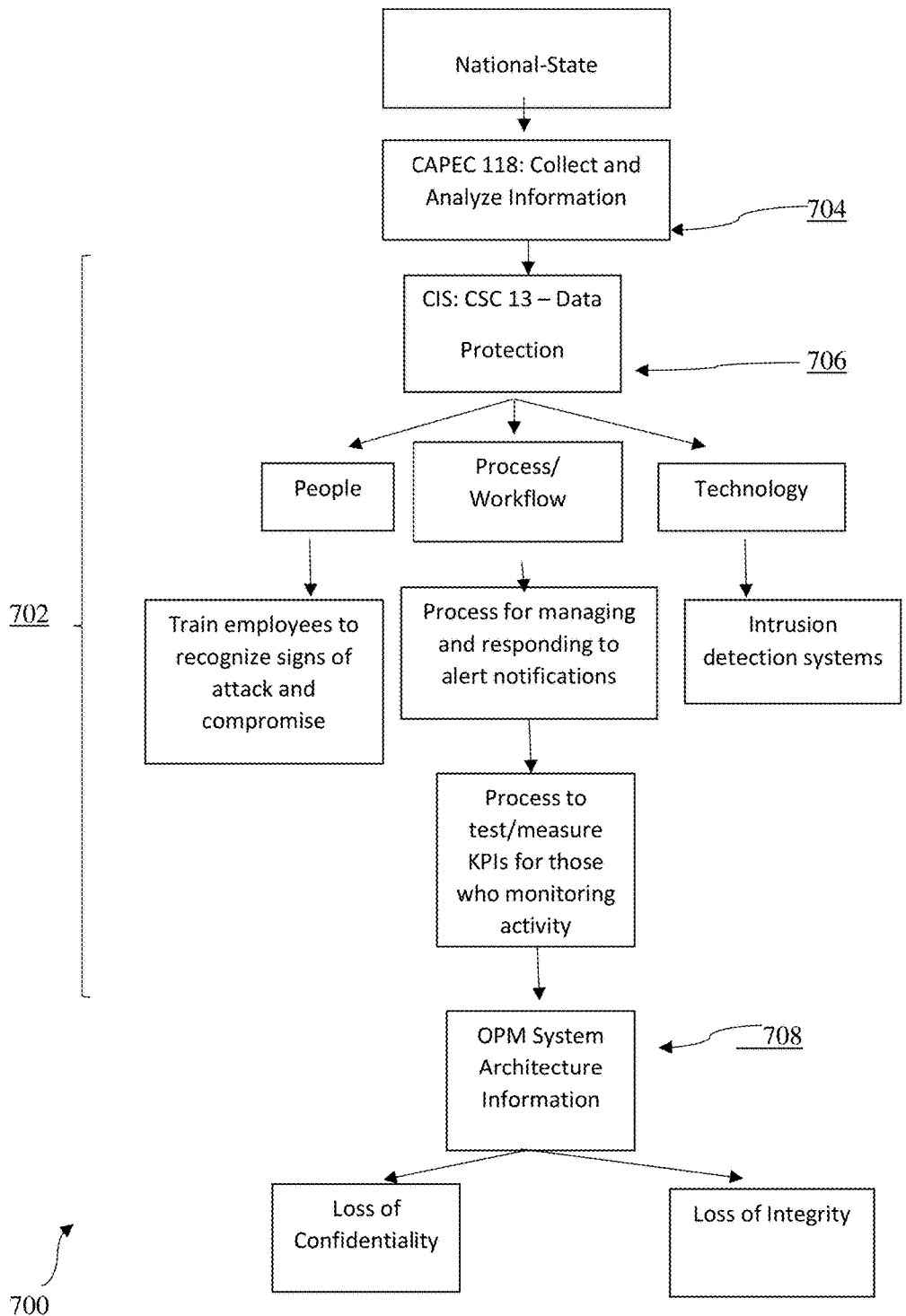
FIG. 7 is an illustrative visual threat model showing the components and relationship between a threat actor, attack type, control mechanisms, and target, in accordance with one or more implementations.

Referring to FIG. 6, an illustrative legend 600 of components of a visual threat model depicted in FIG. 7 is shown. A threat model may visually illustrate the mapping between a threat actor (TCom), attack type (e.g., threat vector), control environment (e.g., current control, dimension, control by dimension, and recommended control), the targeted system, and the impact on the organization. The system may automatically generate a visual graphic of the threat model showing the aforementioned mapping.

The mapping of the attack patterns and control mechanisms may use test scripts that operate on data pulled from the organization's systems of record. A factor analysis of information risk (FAIR) may be performed.

Moreover, in some examples, the cyber kill chain stage (as illustrated in FIG. 6) may be a factor in generating the mapping of the threat model. A cyber kill chain is used to describe the various stages of a cyber attack as it pertains to network security. The framework may be used for identification and prevention of cyber intrusions. The actual steps in a kill chain trace the typical stages of a cyber attack from early reconnaissance to completion where the intruder achieves the cyber intrusion. The seven stages of the cyber kill chain include the following:

A first stage: target definition—A first stage: reconnaissance (and target definition)—for example, to harvest email accounts. In this initial planning phase, the threat actor picks a target person or company. Looking for a suitable target in any industry—retail, finance, hospitality, hi-tech, or other, the threat actor chooses and identifies a target to launch a reconnaissance campaign. A threat actor (e.g., a hacker) may learn about a target company from outside, such as through social engineering. The TCom may try to understand the target network, identify vulnerabilities, and build a profile to implement security control.

A second stage: weaponization—for example, to couple an exploit with a backdoor. With the information gathered, a threat actor may devise a tool such as a worm or virus that gains remote access to a target company's computer network.

A third stage: delivery—for example, to deliver bundle via email or Web. The weapon is delivered to a target network through emails, file transfer through USB devices, bad websites, or other means. Some of defensive control mechanisms include email filtering, web filtering, disable auto play for files from USB devices, scanning USB devices for malware/virus, and other control processes.

A fourth stage: exploitation—for example, to exploit a vulnerability to execute code. In one example, malware code is executed on target's computer network to exploit vulnerable applications or systems. The control process may comprise to detect unauthorized access to the target's computer network and prevent important information disclosure, including ensuring all software is up-to-date in all boxes. Other control processes include gaining more visibility through SIEM solutions, endpoint protection, and using secure passwords.

A fifth stage: installation—for example, to install malware on a target. The malware creates a backdoor into the target's computer network, thus allowing persistence access. Through lateral movement in the network, a threat actor has now installed malware on the target assets, including log monitoring through hardware and virtual sensors to monitor logs and sense malicious activity in log information. Sensors may be used to send alarms for investigation.

A sixth stage: command and control—for example, to command channel for remote manipulation. If the threat has come to this phase, then it will be contacting the botmaster in a command and control channel. Outside server communicates with the weapons access to inside network.

A seventh stage: actions on objectives (e.g., exfiltration)—for example, to achieve their goal of data theft or encryption for ransom, threat actors take necessary actions.

Referring to FIG. 7, an illustrative visual threat model 700 showing the components and relationship between a threat actor, attack type, control mechanisms, and target is shown. Threat model depicts an example where the office of personnel management (OPM) 708 and its systems of record (SOR) might be the target of an attack by a nation-state or other nefarious entity. The attack (or simulated attack—i.e., threat) may follow a common attack pattern enumerated classification (CAPEC 118) attack pattern 704 that is designed to collect and analyze information about the OPM. Meanwhile, a review of OPM's systems of record and architecture shows that OPM has several control mechanisms 702 in place to protect against attacks. In the example of FIG. 7, OPM has a center of Internet security (CIS) 13 control 706 implemented, to at least some extent, to protect the OPM from a threat actor. CIS 13 control is directed to data protection and includes various steps and protocols for data protection. The disclosure divides the CIS 13 control standard into multiple dimensions that cover people, process/workflow, and technology.

The system then runs test scripts to test the entity's (e.g., OPM) implementation of the control mechanism (e.g., CIS 13) in each of the multiple dimensions by extracting pertinent information from OPM's systems of record and determining whether or not the control mechanism is mitigated or unmitigated. For example, in FIG. 7, for the people dimension in CIS 13 control, the control/procedure steps may entail training employees to recognize signs of attack and compromise. The system dynamically compares the SOR data using one or more test scripts, thus determining in real-time whether a dimension of a control mechanism is mitigated or unmitigated. For example, if the SOR indicates that no training has been provided to OPM employees in the past three years and there are many (e.g., more than 10% of the overall employees) newly hired employees that have not completed the training, then the system may determine that this CIS 13 control mechanism on the people dimension is unmitigated.

Similarly, the SOR of OPM may be checked for each of the process/workflow and technology dimensions. For example, in FIG. 7, for the process/workflow dimension in CIS 13 control, the control/procedure steps may entail OPM having a procedure in place for managing and responding to alert notification. If one or more test scripts determine that OPM fails to have this process/workflow dimension of CIS 13 control 706 adequately implemented, then the control dimension would be determined to be unmitigated. In another example, in FIG. 7, for the technology dimension in CIS 13 control 706, the control/procedure steps may entail OPM having one or more intrusion detection systems implemented. If one or more test scripts determine that OPM fails to have this technology dimension of CIS 13 control 706 adequately implemented, then the control dimension would be determined to be unmitigated. Depending on whether the control 706 is determined to be mitigated or unmitigated, the system may generate a recommended control to protect against attacks. In the example of FIG. 7, the recommended control may be one that process to test/measure key performance indicators (KPIs) for those who monitor log activity. As a result, the threat model 700 may reduce the risk of specific negative impact (e.g., loss of confidentiality and loss of integrity) to the OPM 708.

Similar to FIG. 7, in another threat model, the office of personnel management (OPM) 708 and its systems of record (SOR) might be the target of an attack by a nation-state or other nefarious entity. The attack (or simulated attack—i.e., threat) may follow a CAPEC 568 attack pattern that is designed to capture credentials of OPM employees via a keylogger application. OPM may have a center of Internet security (CIS CSC) 8 control implemented, to at least some extent, to protect it from a threat actor. CIS 8 control is directed to malware defenses and includes various steps and protocols for protection against keyloggers. The disclosure divides the CIS 8 control standard into multiple dimensions that cover people, process/workflow, and technology. As in FIG. 7, the system may run one or more test scripts against the entity's implementation of the control mechanism (e.g., CIS 8) in each of the multiple dimensions by extracting pertinent information from systems of record and determining whether or not the control mechanism is mitigated or unmitigated. For the people dimension in CIS 8 control, the control/procedure steps may entail promoting a security focused culture to employees. For the process/workflow dimension in CIS 8 control, the control/procedure steps may entail having a procedure in place to monitor and analyze audit logs. For the technology dimension in CIS 8 control, the control/procedure steps may entail having one or more systems to monitor firewall logs. If one or more test scripts determine that the entity fails to have the multiple dimensions of CIS 8 control adequately implemented, then the control dimension would be determined to be unmitigated. Depending on whether the control is determined to be mitigated or unmitigated, the system may generate a recommended control to protect against attacks. In this example, the recommended control may be one to automate and optimize log activity systems. As a result, the threat model may reduce the risk of specific negative impact (e.g., loss of confidentiality and loss of integrity) to the OPM 708.

Similar to FIG. 7, in another threat model, the office of personnel management (OPM) 708 and its systems of record (SOR) might be the target of an attack by a nation-state or other nefarious entity. The attack (or simulated attack—i.e., threat) may follow a CAPEC 21 attack pattern that is designed for exploitation of trusted credentials of OPM employees and systems. OPM may have a center of Internet security (CIS CSC) 14 control implemented, to at least some extent, to protect it from a threat actor. CIS 14 control is directed to controlled access based on need-to-know and includes various steps and protocols for data protection. The disclosure divides the CIS 14 control standard into multiple dimensions that cover people, process/workflow, and technology. As in FIG. 7, the system may run one or more test scripts against the entity's implementation of the control mechanism (e.g., CIS 14) in each of the multiple dimensions by extracting pertinent information from systems of record and determining whether or not the control mechanism is mitigated or unmitigated. For the people dimension in CIS 14 control, the control/procedure steps may enforce least privileged access. For the process/workflow dimension in CIS 14 control, the control/procedure steps may entail having a procedure in place for periodic access review. For the technology dimension in CIS 14 control, the control/procedure steps may entail having one or more systems implemented to maintain the inventory of critical assets. If one or more test scripts determine that the entity fails to have the multiple dimensions of CIS 14 control adequately implemented, then the control dimension would be determined to be unmitigated. Depending on whether the control is determined to be mitigated or unmitigated, the system may generate a recommended control to protect against attacks. In this example, the recommended control may be one that enforces a consequence model for those who do not revoke unnecessary access. As a result, the threat model may reduce the risk of specific negative impact (e.g., loss of confidentiality and loss of integrity) to the OPM.

Similar to FIG. 7, in yet another threat model, the office of personnel management (OPM) and its systems of record (SOR) might be the target of an attack by a nation-state or other nefarious entity. The attack (or simulated attack—i.e., threat) may follow a CAPEC 163 attack pattern that is designed for spear phishing the OPM for personally identifiable information (PII) stored in background checks and OPM login credentials. OPM may have a center of Internet security (CIS CSC) 17 control implemented, to at least some extent, to protect it from a threat actor. CIS 17 control is directed to security skills assessment and appropriate training to fill gaps. The disclosure divides the CIS 17 control standard into multiple dimensions that cover people, process/workflow, and technology. As in FIG. 7, the system may run one or more test scripts against the entity's implementation of the control mechanism (e.g., CIS 17) in each of the multiple dimensions by extracting pertinent information from systems of record and determining whether or not the control mechanism is mitigated or unmitigated. For the people dimension in CIS 17 control, the control/procedure steps may entail confirming that employees are trained to recognize phishing attempts. For the process/workflow dimension in CIS 17 control, the control/procedure steps may entail enforcing regular, mandatory training of OPM employees. For the technology dimension in CIS 17 control, the control/procedure steps may entail having one or more incident response technical infrastructure implemented. If one or more test scripts determine that the entity fails to have the multiple dimensions of CIS 17 control adequately implemented, then the control dimension would be determined to be unmitigated. Depending on whether the control is determined to be mitigated or unmitigated, the system may generate a recommended control to protect against attacks. In this example, the recommended control may be one that improves training, such as training employees to never click on suspicious links, login, or provide sensitive information. As a result, the threat model may reduce the risk of specific negative impact (e.g., loss of confidentiality and loss of integrity) to the OPM where PII is stored in background checks and OPM login credentials.

Similar to FIG. 7, in yet another threat model, the office of personnel management (OPM) and its systems of record (SOR) might be the target of an attack by a nation-state or other nefarious entity. The attack (or simulated attack—i.e., threat) may follow a CAPEC 21 attack pattern 704 that is designed for exploitation of trusted credentials associated with the OPM. OPM may have a center of Internet security (CIS CSC) 14 control implemented, to at least some extent, to protect it from a threat actor. CIS 14 control is directed to controlled access based on need-to-know and includes various steps and protocols for data protection. The disclosure divides the CIS 14 control standard into multiple dimensions that cover people, process/workflow, and technology. As in FIG. 7, the system may run one or more test scripts against the entity's implementation of the control mechanism (e.g., CIS 14) in each of the multiple dimensions by extracting pertinent information from systems of record and determining whether or not the control mechanism is mitigated or unmitigated. For the people dimension in CIS 14 control, the control/procedure steps may enforce least privileged access. For the process/workflow dimension in CIS 14 control, the control/procedure steps may entail having a procedure in place for periodic access review. For the technology dimension in CIS 14 control, the control/procedure steps may entail having one or more systems implemented to maintain the inventory of critical assets. If one or more test scripts determine that the entity fails to have the multiple dimensions of CIS 14 control adequately implemented, then the control dimension would be determined to be unmitigated. Depending on whether the control is determined to be mitigated or unmitigated, the system may generate a recommended control to protect against attacks. In this example, given the specific OPM systems that are the target of the threat actor and other information from the SOR, the system may generate a recommended control to implement a process to periodically verify that all identify tokens are encrypted and/or signed. As a result, the threat model may reduce the risk of specific negative impact (e.g., loss of confidentiality and loss of integrity) to the OPM where PII is stored in background checks and OPM login credentials.

Similar to FIG. 7, in yet another threat model, the office of personnel management (OPM) and its systems of record (SOR) might be the target of an attack by a nation-state or other nefarious entity. The attack (or simulated attack—i.e., threat) may follow a CAPEC 49 attack pattern 704 that is designed for password brute forcing the OPM systems for personally identifiable information (PII) stored in background checks and OPM login credentials. OPM may have a center of Internet security (CIS CSC) 14 control implemented, to at least some extent, to protect it from a threat actor. CIS 14 control is directed to account monitoring and control. The disclosure divides the CIS 14 control standard into multiple dimensions that cover people, process/workflow, and technology. As in FIG. 7, the system may run one or more test scripts against the entity's implementation of the control mechanism (e.g., CIS 14) in each of the multiple dimensions by extracting pertinent information from systems of record and determining whether or not the control mechanism is mitigated or unmitigated. For the people dimension in CIS 14 control, the control/procedure steps may require that OPM employees use strong passwords. For the process/workflow dimension in CIS 14 control, the control/procedure steps may entail monitoring system and application accounts for creation, use, and dormancy. For the technology dimension in CIS 14 control, the control/procedure steps may entail having one or more systems implemented for access review. If one or more test scripts determine that the entity fails to have the multiple dimensions of CIS 14 control adequately implemented, then the control dimension would be determined to be unmitigated. Depending on whether the control is determined to be mitigated or unmitigated, the system may generate a recommended control to protect against attacks. In this example, given the specific OPM systems that are the target of the threat actor and other information from the SOR, the system may generate a recommended control to implement a password throttling mechanism that accounts for both the Internet protocol (IP) address and the login name of the user. As a result, the threat model may reduce the risk of specific negative impact (e.g., loss of confidentiality and loss of integrity) to the OPM where PII is stored in background checks and OPM login credentials.

Similar to FIG. 7, in yet another threat model, the office of personnel management (OPM) and its systems of record (SOR) might be the target of an attack by a nation-state or other nefarious entity. The attack (or simulated attack—i.e., threat) may follow a CAPEC 416 attack pattern that is designed to manipulate human behavior of the OPM to procure personally identifiable information (PII) stored in background checks and OPM login credentials. OPM may have a center of Internet security (CIS CS) 17 control implemented, to at least some extent, to protect it from a threat actor. CIS 17 control is directed to security skills assessment and appropriate training to fill gaps and includes various steps and protocols accordingly. The disclosure divides the CIS 17 control standard into multiple dimensions that cover people, process/workflow, and technology. As in FIG. 7, the system may run one or more test scripts against the entity's implementation of the control mechanism (e.g., CIS 17) in each of the multiple dimensions by extracting pertinent information from systems of record and determining whether or not the control mechanism is mitigated or unmitigated. For the people dimension in CIS 17 control, the control/procedure steps may entail training employees to recognize phishing attempts. For the process/workflow dimension in CIS 17 control, the control/procedure steps may entail enforcing regular, mandatory training. For the technology dimension in CIS 17 control, the control/procedure steps may entail having one or more incident response technical infrastructure implemented. If one or more test scripts determine that the entity fails to have the multiple dimensions of CIS 17 control adequately implemented, then the control dimension would be determined to be unmitigated. Depending on whether the control is determined to be mitigated or unmitigated, the system may generate a recommended control to protect against attacks. In this example, the recommended control may be one that enforces MFA. As a result, the threat model may reduce the risk of specific negative impact (e.g., loss of confidentiality and loss of integrity) to the OPM where PII is stored in background checks and OPM login credentials.

Similar to FIG. 7, in another threat model, the office of personnel management (OPM) and its systems of record (SOR) might be the target of an attack by a nation-state or other nefarious entity. The attack (or simulated attack—i.e., threat) may follow a CAPEC 441 attack pattern 704 that is designed for malicious logic insertion at the OPM to capture personally identifiable information (PII) stored in background checks and OPM login credentials. OPM may have a center of Internet security (CIS CS) 8 control implemented, to at least some extent, to protect it from a threat actor. CIS 8 control is directed to malware defenses and includes various steps and protocols accordingly. The disclosure divides the CIS 8 control standard into multiple dimensions that cover people, process/workflow, and technology. As in FIG. 7, the system may run one or more test scripts against the entity's implementation of the control mechanism (e.g., CIS 8) in each of the multiple dimensions by extracting pertinent information from systems of record and determining whether or not the control mechanism is mitigated or unmitigated. For the people dimension in CIS 8 control, the control/procedure steps may entail promoting a security focused culture among OPM employees. For the process/workflow dimension in CIS 8 control, the control/procedure steps may entail having a procedure in place for monitoring and analyzing audit logs. For the technology dimension in CIS 8 control 706, the control/procedure steps may entail having one or more antivirus/firewall activity logging systems implemented. If one or more test scripts determine that the entity fails to have the multiple dimensions of CIS 8 control adequately implemented, then the control dimension would be determined to be unmitigated. Depending on whether the control is determined to be mitigated or unmitigated, the system may generate a recommended control to protect against attacks. In this example, the recommended control may be one that tests/implements key performance indicators (KPIs) for measuring security acumen—e.g., fake phishing emails. As a result, the threat model may reduce the risk of specific negative impact (e.g., loss of confidentiality and loss of integrity) to the OPM where PII is stored in background checks and OPM login credentials.

Similar to FIG. 7, in another threat model, the office of personnel management (OPM) and its systems of record (SOR) might be the target of an attack by a nation-state or other nefarious entity. The attack (or simulated attack—i.e., threat) may follow a CAPEC 55 attack pattern 704 that uses remote services with stolen credentials for the OPM to obtain personally identifiable information (PII) stored in background checks and OPM login credentials. OPM may have a center of Internet security (CIS CS) 12 control implemented, to at least some extent, to protect it from a threat actor. CIS 12 control is directed to boundary defense and includes various steps and protocols for data protection. The disclosure divides the CIS 12 control standard into multiple dimensions that cover people, process/workflow, and technology. As in FIG. 7, the system may run one or more test scripts against the entity's implementation of the control mechanism (e.g., CIS 12) in each of the multiple dimensions by extracting pertinent information from systems of record and determining whether or not the control mechanism is mitigated or unmitigated. For the people dimension in CIS 12 control, the control/procedure steps may entail training employees to recognize unusual data flow activity. For the process/workflow dimension in CIS 12 control, the control/procedure steps may entail having a process in place for determining which alerts require analyst attention. For the technology dimension in CIS 12 control, the control/procedure steps may entail having one or more systems to monitor for date exfiltration. If one or more test scripts determine that the entity fails to have the multiple dimensions of CIS 12 control adequately implemented, then the control dimension would be determined to be unmitigated. Depending on whether the control is determined to be mitigated or unmitigated, the system may generate a recommended control to protect against attacks. In this example, the recommended control may be one that updates to optimize the balance of system alerts to avoid analyst overload. As a result, the threat model may reduce the risk of specific negative impact (e.g., loss of confidentiality and loss of integrity) to the OPM where PII is stored in background checks and OPM login credentials.

Figure 8:
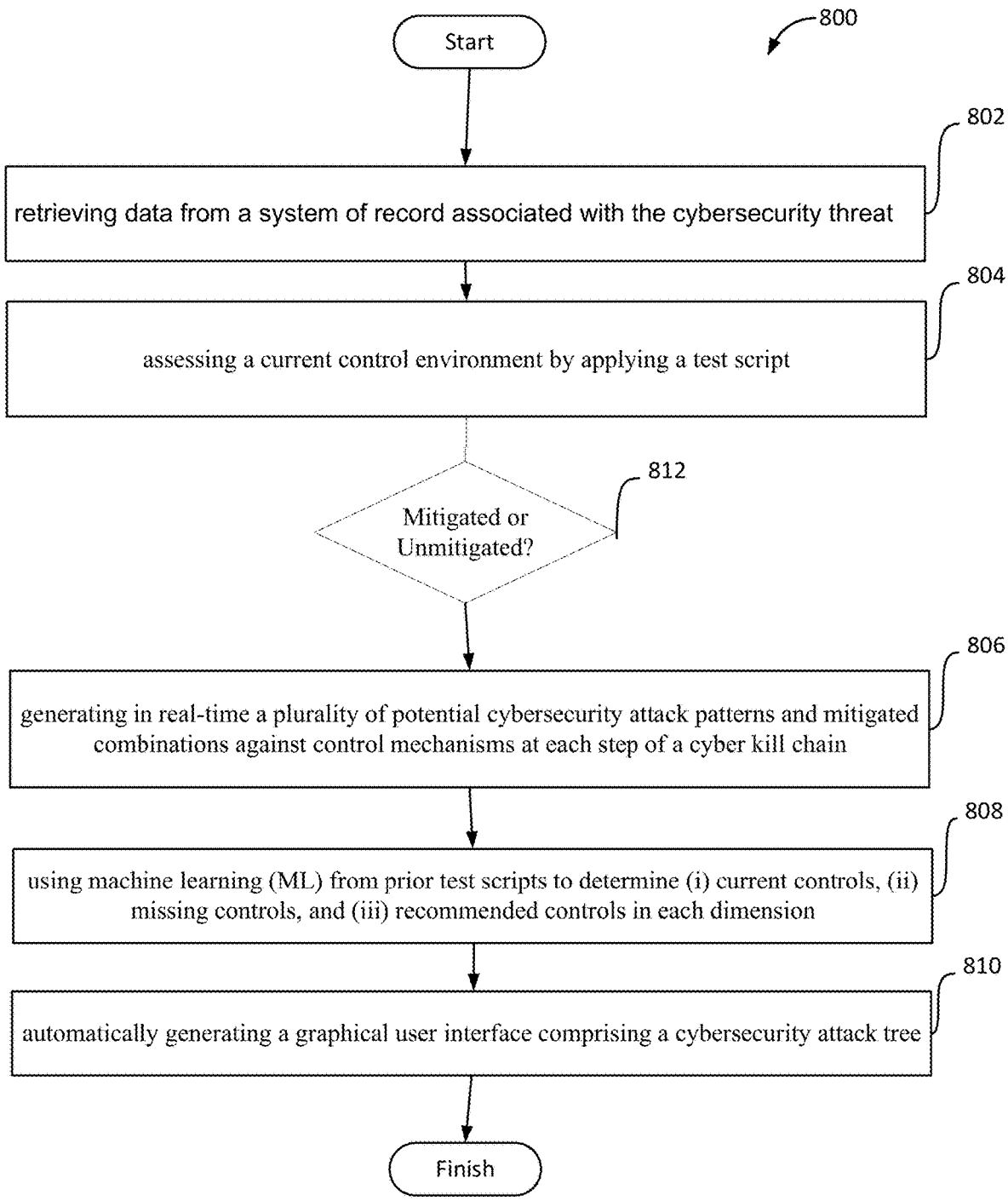
FIG. 8 is an illustrative flowchart of a method performed in accordance with one or more implementations.

FIG. 8 illustrates a flowchart of a method in accordance with one or more implementations disclosed herein. The method 800 steps are for determining in real-time the likelihood of a failure (e.g., a breach of security) due to a multi-dimensional cybersecurity threat. Although the method 800 is shown as directed to a cybersecurity threat, the threat modeling described herein is not limited to just the cybersecurity realm. Rather, multi-dimensional threats to an entity/organization may originate from the tangible, physical realm or other sources outside of cybersecurity. In addition, the operations of method 800 are intended to be illustrative. In some implementations, method 800 may be accomplished with one or more additional operations not described, and/or without one or more of the operations discussed. Additionally, the order in which the operations of method 800 are illustrated in the accompanying figures and described below is not intended to be limiting.

Step 802 in FIG. 8 comprises automatically retrieving data from a system of record (SOR) associated with the cybersecurity threat.

Step 804 in FIG. 8 comprises assessing a current control environment by applying a test script stored in a library of test scripts in compliance with industry and internal security frameworks.

Step 812 in FIG. 8 comprises identifying a control type as one of mitigated and unmitigated, in each of a plurality of dimensions.

Step 806 in FIG. 8 comprises generating in real-time a plurality of potential cybersecurity attack patterns and mitigated combinations against control mechanisms at each step of a cyber kill chain. A non-exhaustive list of examples of common attack pattern enumerated classifications (CAPEC) and other groupings of CAPEC-like classifications are below:

Make the Client Invisible
Target Programs That Write to Privileged OS Resources
Use a User-Supplied Configuration File to Run Commands That Elevate Privilege
Make Use of Configuration File Search Paths
Direct Access to Executable Files
Embedding Scripts within Scripts
Leverage Executable Code in Nonexecutable Files
Argument Injection
Command Delimiters
Multiple Parsers and Double Escapes
User-Supplied Variable Passed to File System Calls
Postfix NULL Terminator
Postfix, Null Terminate, and Backslash
Relative Path Traversal
Client-Controlled Environment Variables
User-Supplied Global Variables (DEBUG=1, PHP Globals, and So Forth)
Session ID, Resource ID, and Blind Trust
Analog In-Band Switching Signals (aka "Blue Boxing")
Attack Pattern Fragment: Manipulating Terminal Devices
Simple Script Injection
Embedding Script in Nonscript Elements
XSS in HTTP Headers
HTTP Query Strings
User-Controlled Filename
Passing Local Filenames to Functions That Expect a URL
Meta-characters in E-mail Header
File System Function Injection, Content Based
Client-side Injection, Buffer Overflow
Cause Web Server Misclassification
Alternate Encoding the Leading Ghost Characters
Using Slashes in Alternate Encoding
Using Escaped Slashes in Alternate Encoding
Unicode Encoding
UTF-8 Encoding
URL Encoding
Alternative IP Addresses
Slashes and URL Encoding Combined
Web Logs
Overflow Binary Resource File
Overflow Variables and Tags
Overflow Symbolic Links
MIME Conversion
HTTP Cookies
Filter Failure through Buffer Overflow
Buffer Overflow with Environment Variables
Buffer Overflow in an API Call
Buffer Overflow in Local Command-Line Utilities
Parameter Expansion
String Format Overflow in syslog( )

Step 808 in FIG. 8 comprises using machine learning (ML) from prior test scripts and test results to determine (i) current controls, (ii) missing controls, and (iii) recommended controls in each dimension. The system may use factors such as the criticality of the asset, the centrality of the asset, the level of skill of the threat actor, the strength of mitigating controls, and any historical data (such as previously observed attacks) to determine whether the current controls, as defined by the CIS, are current, missing or inadequate, and if there are other recommended controls to implement in each of the multiple dimensions of the control. In some examples, the aforementioned factors may also be an input in generating and updating test scripts of the system to accommodate changing/new CAPEC patterns and target system responses to attacks.

In addition, the threat model of the system may incorporate weightings. For example, in some embodiments, certain attack patterns may be given more or less weight than others. As such, the aforementioned factors, such as the criticality of the asset, the centrality of the asset, the skill of the threat actor, the strength of mitigating controls, and any historical data, may be used to determine appropriate weightings for the threat model. For example, control mechanisms may have a weighting with respect to a specific attack pattern—e.g., a keylogger control, which corresponds to a futile keylogger attack because it is blocked by most security-aware target organizations, may be assigned a lower weighting than other CIS controls. Other examples will be apparent to a person skilled in the art after review of the entirety disclosed herein.

Step 810 in FIG. 8 comprises automatically generating a graphical user interface comprising a cybersecurity attack tree showing a combination of at least a threat actor, attack pattern, and target in each step of the cyber kill chain. In addition to a graphical output, the output from step 810 may be of a formatted file type that can be inputted into a cybersecurity server device such that the security behavior of the device is updated to accommodate the threat model.

For example, referring to FIG. 4, the firewall device 404 may update its cybersecurity mode from low to high based on instructions/commands received by the cybersecurity server 402 from the system disclosed herein.

Referring again to FIG. 4, in one example, the method steps 800 of FIG. 8 may operate on a system 400 with a plurality of physical, networked assets that include, but are not limited to, a database server device, an application server device, a web server device 408, a user terminal 406, and/or other networked devices. The method 800 may also include a predictive analytics engine that may be executed by the computer processor in a cybersecurity server 402 configured to measure cybersecurity threats effecting at least one of the plurality of physical, networked assets.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on a non-transient electronic storage medium. The one or more processing devices may include one or more devices configured through hardware, firmware, and/or software to be specifically designed for execution of one or more of the operations of method 800. For example, the steps of method 800 may be performed by one or more hardware processors configured by machine-readable instructions including a module that is the same as or similar to module 308, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for determining in real-time a likelihood of failure due to a multi-dimensional cybersecurity threat, the method comprising: automatically retrieving, by a computer processor, data from a system of record associated with a cybersecurity threat; assessing, by the computer processor, a current control environment by applying a test script stored in a library of test scripts in compliance with industry and internal security frameworks;
identifying, by the computer processor, a control type as one of mitigated and unmitigated, in each of a plurality of dimensions;
generating, by the computer processor, in real-time a plurality of potential cybersecurity attack patterns and mitigated combinations against control mechanisms at each step of a cyber kill chain;
using machine learning (ML) from prior test scripts to determine (i) current controls, (ii) missing controls, and (iii) recommended controls for the plurality of dimensions, wherein the ML is trained with at least one location feature; using the ML and according to a specified threshold from the prior test scripts further comprises to determine a likelihood of success of the cybersecurity threat with a predictive analytics engine, wherein the predictive analytics engine executes in the real-time of the generating of the plurality of potential cybersecurity attack patterns; and automatically generating, by the computer processor, a graphical user interface comprising a cybersecurity attack tree showing a combination of at least a threat actor, attack pattern, and target in at least one stage of the cyber kill chain; and
wherein the cybersecurity attack tree shows a further combination of at least an attack vector, a mitigating control by dimension, target, and effect in the at last one stage of the cyber kill chain.

2. The method of claim 1, wherein the ML training data is based on a criticality of an asset, a centrality of the asset, a skill of the threat actor, a strength of mitigating controls, and historical data about previously observed cybersecurity attacks.

3. The method of claim 1, wherein ML training data includes at least one attack pattern feature.

4. The method of claim 1, wherein the plurality of potential cybersecurity attack patterns are categorized by a common attack pattern enumerated classification (CAPEC).

5. The method of claim 1, wherein stages of the cyber kill chain comprise reconnaissance, weaponization, delivery, exploit, installation, command and control, and actions.

6. The method of claim 1, wherein the plurality of dimensions comprise people, process, and technology.

7. A multi-dimensional cybersecurity threat modeling system comprising:
a computer processor; a tangible computer memory storing computer-executable instructions that, when executed by the computer processor, cause the multi-dimensional cybersecurity threat modeling system to:
automatically retrieve data from a system of record associated with a cybersecurity threat; assess a current control environment by applying a test script; identify a control type as one of mitigated and unmitigated, in each of a plurality of dimensions; generate in real-time a plurality of potential cybersecurity attack patterns and mitigated combinations against control mechanisms at each stage of a cyber kill chain; use machine learning (ML) from prior test scripts to determine at least one of: (i) current controls, (ii) missing controls, and (iii) recommended controls for a plurality of dimensions, wherein the ML is trained with at least one location feature; using the ML and according to a specified threshold from the prior test scripts further comprises to determine a likelihood of success of the cybersecurity threat with a predictive analytics engine,
wherein the predictive analytics engine executes in the real-time of the generating of the plurality of potential cybersecurity attack patterns; and automatically generate a graphical user interface comprising a cybersecurity attack tree showing a combination of at least a threat actor, attack pattern, and target in at least one stage of the cyber kill chain; and wherein the cybersecurity attack tree shows a further combination of at least an attack vector, a mitigating control by dimension, target, and effect in the at last one stage of the cyber kill chain.

8. The system of claim 7, wherein ML training data from prior test scripts is based on a criticality of an asset, a centrality of the asset, a skill of the threat actor, a strength of mitigating controls, and historical data about previously observed cybersecurity attacks.

9. The system of claim 7, wherein ML training data includes at least one attack pattern feature.

10. The system of claim 7, wherein the plurality of potential cybersecurity attack patterns are categorized by a common attack pattern enumerated classification (CAPEC), and wherein stages of the cyber kill chain comprise reconnaissance, weaponization, delivery, exploit, installation, command and control, and actions.

11. The system of claim 7, wherein the test script is stored in a library of test scripts in compliance with industry and internal security frameworks.

12. A tangible, non-transitory computer readable medium storing computer-executable instructions that, when executed by a computer processor, cause a multidimensional cybersecurity threat modeling system to:
   automatically retrieve data from a system of record associated with a cybersecurity threat of one or more networked assets; assess a current control environment by applying a test script;
   identify a control type as one of mitigated and unmitigated, in each of a plurality of dimensions; generate in real-time a plurality of potential cybersecurity attack patterns and mitigated combinations against control mechanisms at each stage of a cyber kill chain;
   use machine learning (ML) from prior test scripts to determine at least one of: (i) current controls, (ii) missing controls, and (iii) recommended controls for a plurality of dimensions,
   wherein the ML is trained with at least one location feature; using the ML and according to a specified threshold from the prior test scripts further comprises to determine a likelihood of success of the cybersecurity threat with a predictive analytics engine, wherein the predictive analytics engine executes in the real-time of the generating of the plurality of potential cybersecurity attack patterns; automatically generate a graphical user interface comprising a cybersecurity attack tree showing a combination of at least a threat actor, attack pattern, and target in at least one stage of the cyber kill chain; and wherein the cybersecurity attack tree shows a further combination of at least an attack vector, a mitigating control by dimension, target, and effect in the at last one stage of the cyber kill chain.

13. The computer-readable medium of claim 12, wherein the plurality of dimensions comprise people, process, and technology.

14. The computer-readable medium of claim 12, wherein the recommended controls comprise a mitigation strategy comprising at least one of: applying a patch to the one or more networked assets, issuing a renewed security certificate, and physically altering an architecture of the one or more networked assets.

* * * * *